Aug. 6, 1946.    K. H. W. TUERCK ET AL    2,405,471
MANUFACTURE OF ACETIC ANHYDRIDE
Filed July 17, 1945
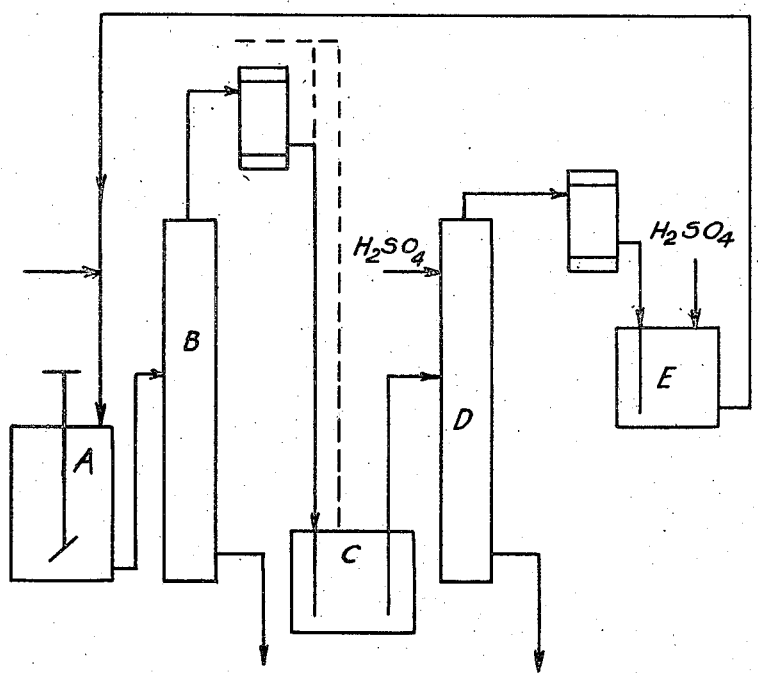
Inventors
Karl Heinrich Walter Tuerck,
Eric Harvey Brittain, Patented Aug. 6, 1946

2,405,471

UNITED STATES PATENT OFFICE 2,405,471

MANUFACTURE OF ACETIC ANHYDRIDE

Karl Heinrich Walter Tuerck, Heathfield, Buckles Way, Banstead, and Eric Harvey Brittain, Epsom Downs, England, assignors to The Distillers Company Limited, Edinburgh, Scotland, a British company Original application October 29, 1942, Serial No. 463,819. Divided and this application July 17, 1945, Serial No. 605,607. In Great Britain July 23, 1941

8 Claims. (Cl. 260—546)

This invention relates to the manufacture of acetic anhydride by direct oxidation of acetaldehyde with gaseous oxygen. It has already been proposed in prior British Patent No. 461,808 to carry out this process in the presence of esters, especially ethyl-acetate, as diluents. Ethers have been considered as unsuitable for this purpose as they tend to produce explosive peroxides during the oxidation.

Though the addition of esters improves the yield of acetic anhydride, it involves the disadvantage of the use of a substance which does not take part in the process and which, therefore has to be readily separable as such from the other products, especially from acetic acid. The number of useful diluents is therefore almost entirely restricted to ethylacetate, which can be separated from acetic acid, but whose low boiling point gives rise to difficulties during the oxidation and causes considerable losses during the distillation of the reaction products especially under reduced pressure.

We have now found that the manufacture of acetic anhydride can be improved if the oxidation of acetaldehyde is carried out in the presence of paraldehyde.

Though paraldehyde may be considered to possess the chemical structure of an ether, we have found that under the conditions of the process of the invention, the concentration or character of the percompounds do not essentially differ from those obtained when esters are used as diluents. Paraldehyde which is considerably less volatile than ethylacetate is readily obtained from or converted to acetaldehyde by polymerisation and depolymerisation respectively, and it is an object of our invention to provide a process in which the diluent can be used as a raw material for the production of acetic anhydride.

According to the present invention a mixture of acetaldehyde and paraldehyde is oxidised with molecular oxygen or gases containing molecular oxygen, e. g. air, at temperatures preferably below 60° C. e. g. 30 to 50° C., and after the oxidation the reaction mixture is worked up under conditions which minimize hydrolysis of the formed acetic anhydride. The oxidation is preferably carried out under superatmospheric pressure and in the presence of catalysts.

We have found that paraldehyde is able to entrain water during the distillation of a mixture of acetic anhydride, acetic acid, paraldehyde and water, in the form of a minimum boiling mixture. The pure azeotropic mixture contains 2.5 parts of paraldehyde and 1 part of water, and boils at 89 to 91°/760 mm. This azeotropic mixture separates out into two layers on condensation.

It is therefore a further feature of our invention to subject the reaction mixture to distillation so that the water formed during the reaction is removed in the form of a low boiling fraction with paraldehyde. It is possible to effect this azeotropic distillation under reduced pressure at temperatures below 50° C. Preferably the water is distilled from the reaction mixture at temperatures at which the rate of saponification of the anhydride is still relatively slow.

The oxidation may be carried out in various ways. The acetaldehyde may be introduced into the reaction zone as vapour entrained in the oxidising gas and/or dissolved in the paraldehyde.

One method is to use mixtures of acetaldehyde and paraldehyde which have been prepared by depolymerisation of paraldehyde or polymerisation of acetaldehyde before the oxidation is started, e. g. paraldehyde is heated to 40° C. in the presence of a trace of sulphuric acid and the resulting mixture of 20% acetaldehyde and 80% paraldehyde is, after neutralisation of the catalyst, subjected to the oxidation reaction.

Another method is to heat paralydehyde with a mild polymerising agent to higher temperatures in order to depolymerise it to the desired extent and thereafter to oxidise the mixture at lower temperatures at which no further depolymerisation or polymerisation takes place. A suitable depolymerisation agent for this purpose is vanadic acid which, we find, rapidly depolymerises paraldehyde especially in presence of (some) acetic acid, at temperatures above 50 to 60° C., e. g. 80°, and which can be used as an oxidation catalyst for the subsequent oxidation with oxygen at 30 to 45° C., at which temperatures polymerisation of the free acetaldehyde under the reaction conditions is negligible.

As we have further found, it is possible to utilise paraldehyde itself as the raw material for oxidation to acetic anhydride and to obtain in this way acetic anhydride in satisfactory yields. According to this method paraldehyde is subjected to the action of molecular oxygen in the presence of a depolymerising agent which is able to depolymerise the paraldehyde under the conditions at which the oxidation is carried out.

Such depolymerising agents are sulphuric acid, phosphoric acid, organic sulphonic acids, acidic salts such as zinc chloride, aluminum chloride, ferric chloride, and others. It may be noted that vanadic acid alone only functions as a depolymerising agent at a temperature above 50° C. depolymerisation of the paraldehyde is however assisted by the formation of acetic acid as the reaction proceeds and the reaction temperature can therefore be reduced below 50° C. once the reaction has started.

An important advantage of using paraldehyde for the oxidation is that the acetaldehyde can be oxidised at the rate at which it is formed, so that the concentration of free acetaldehyde in the solution and consequently in the gas phase is at a minimum. This reduces the danger of explosion which is an important factor in the manufacture of acetic anhydride in view of the high pressures of oxygen used. A further advantage is that the percompounds are almost entirely present in the form of peracids, whereas in neutral solutions peroxides are in higher concentrations. The peracids are less stable and therefore easier to remove than the peroxides.

In this latter process of direct oxidation of paraldehyde the amount of catalyst required is preferably not greater than that amount which is necessary to induce depolymerisation. It is, in fact, a surprising observation that high yields of anhydride are obtained in the presence of acidic depolymerising agents which are known to be saponifying agents for acetic anhydride and that at the low catalyst concentrations a sufficient rate of depolymerisation can be effected.

The oxidation catalysts used in the oxidation process should be of such a chemical nature as not to interfere with the activity of the depolymerising catalyst. For example, when adding an acetate, such as manganese or cobalt acetate, care should be taken that the amount used is not such as to neutralise the depolymerisation catalyst. Vanadic acid is found to be a specially suitable oxidising catalyst particularly when activated by means of acetic acid. Very efficient catalysts can also be obtained by precipitating vanadic acid from its salts by means of acetic acid or any other acid directly in the reaction mixture or in acetic acid or other organic solvent immediately prior to the commencement of the reaction. Active solutions of vanadic acid can be obtained by treating vanadium pentoxide (for example in acetic acid) with hydrogen peroxide or any other peroxidic compound so that the vanadium pentoxide is caused to dissolve in acetic acid. Such a catalyst may be also admixed with other catalysts such as cobalt acetate or manganese acetate, but the amount of these latter substances should be smaller than the amount of vanadic acid used.

The utilisation of paraldehyde in the present process enables the manufacture of acetic anhydride to be carried out in the form of a simple cyclic process.

For example the reaction mixture is introduced into a column at the top of which the mixture of paraldehyde and water, together with small amounts of acetaldehyde if present, is drawn off. The paraldehyde in the distillate is returned to the oxidation. The remaining mixture, which runs down the column, contains acetic acid, paraldehyde and acetic anhydride.

By further fractionation a mixture of acetic acid and paraldehyde, can be isolated and either returned to the oxidation or separated by distillation with water or by distillation with small amounts of a depolymerising catalyst so that acetaldehyde distils over. The separation of the mixture of paraldehyde and acetic acid can also be effected by distilling it slowly at at least atmospheric pressure so that at the top of the column acetaldehyde distils over. The acetaldehyde obtained by these means is returned to the oxidation, either as such or after having been polymerised to paraldehyde.

We have found that it is advantageous to carry out the distillation, when paraldehyde and acetic acid are present and the paraldehyde is not to be depolymerised deliberately, under vacuum so that the distillation temperatures are below 70° C. Generally speaking it is advisable to neutralise any acidic depolymerising catalyst before distilling the reaction products. It is possible, however, by reducing the temperature of the distillation to a sufficiently low value, e. g. below 30° C., so that the depolymerisation catalyst is no longer active, to distil without neutralisation. Owing to the reversibility of the depolymerisation of paraldehyde to acetaldehyde the present invention provides a continuous process which is simple and entirely cyclic and which is now described with reference to the accompanying diagrammatic drawing. From the reaction vessel A in which a mixture of acetaldehyde and paraldehyde is treated with oxygen, a certain amount of the reaction liquid is continuously or periodically withdrawn and introduced into a distillation column B which is so conducted that at its base the concentrated water-free acetic anhydride collects, whereas all the other reaction products, namely paraldehyde, acetic acid, water and small amounts of acetaldehyde distil over at the top and are collected as condensate in a tank C. The column is preferably kept under vacuum so that losses in acetic anhydride and depolymerisation of paraldehyde are restricted. From the tank C the mixture, which is free from anhydride, is passed into a second distillation column D, in which the depolymerisation of the paraldehyde is effected at normal pressure, small amounts of sulphuric acid being added if necessary. At the bottom of the column the acetic acid and the water are collected, whereas the acetaldehyde is condensed into a cooled receiver E containing paraldehyde and a polymerising agent. According to the temperature in the receiver E a mixture of paraldehyde and acetaldehyde of a definite composition is obtained which can be directly returned to the reaction vessel A. In case the oxidation is to be carried out in the absence of an acidic depolymerisation agent, the mixture is first neutralised or a sufficient amount of neutralising agent is constantly kept in the oxidation vessel.

Such a cyclic process makes it possible to work economically even with small conversions (e. g. less than 30%) in the oxidation. This means high yields in acetic anhydride and low concentrations of percompounds. It is advisable to select the size of the various columns so that the contents of the reaction vessel can be cycled through the apparatus in ½ to 1 hour.

The following examples in which quantities are calculated by weight illustrate the manner in which the invention may be carried into effect.

*Example 1.*—A mixture of 80% paraldehyde and 20% acetaldehyde is treated with oxygen in a reaction vessel at 45° C. in the presence of 0.1% vanadic acid. After ½ hour the whole amount of acetaldehyde is practically oxidised, and a fresh neutral mixture of paraldehyde and acetaldehyde is introduced while the corresponding volume of liquid is continuously withdrawn and worked up as described above. 60% of the converted aldehyde can be obtained as acetic anhydride, while the unchanged paraldehyde is distilled off from the acetic acid as acetaldehyde, which is condensed at 40° C. in paraldehyde in the presence of 0.1% sulphuric acid so as to give a mixture of 80% paraldehyde and 20% acetaldehyde, which after being neutralised with solid sodium acetate, is returned to the oxidation vessel.

*Example 2.*—Paraldehyde containing 0.01% sulphuric acid and 0.1% of vanadic acid (made by heating ammonium vanadate with acetic acid and redispersing the red-brown precipitate in acetic acid) was treated with oxygen at 32° C. and 1300 mm. Hg for 30 minutes. During the oxidation the acetaldehyde content was found to be below 1.5%. 67.5% by weight of the paraldehyde was converted into a mixture of acetic acid and acetic anhydride, the latter constituting 59% of the oxidation products. The unchanged paraldehyde together with the water formed is distilled off in vacuo at 29° C., leaving a residue of acetic acid and acetic anhydride.

*Example 3.*—A mixture, prepared by adding to a solution containing 50 parts paraldehyde, 50 parts acetic acid and 0.1 part sulphuric acid, a solution of 0.2 part cobalt acetate and 0.2 part copper acetate in acetic acid, was oxidised for 20 minutes at 38° C. The oxidation was stopped when 40% by weight of the paraldehyde had been converted. Of the products of conversion, 45% by weight was acetic anhydride and the remainder acetic acid. The mixture was diluted with 100 parts of paraldehyde and distilled, so that first a fraction containing paraldehyde and water, then a fraction of paraldehyde and acetic acid distilled over. The latter fraction was used as such in the next oxidation.

If the concentration of percompounds in the reaction product exceeds the limit which is usually regarded to be safe for working up, it is possible to reduce the amount of percompounds, say to below 0.5%, by diluting the reaction mixture with paraldehyde and to work up the mixture in one of the ways described above. During the working up, the percompounds decompose gradually without undue rise in temperature, and the excess of paraldehyde is recovered together with the original amount.

If large amounts of the percompounds are present in the reaction product and have to be removed, we have found that this can be achieved by adding a small amount of manganese acetate to the reaction mixture after oxidation. If an acidic depolymerising agent is present in the oxidation mixture, we prefer to add the exact amount of manganese acetate which is necessary to neutralise the depolymerising agent.

This application is a division of application No. 463,819, filed October 29, 1942.

What we claim is:

1. In a process for the manufacture of acetic anhydride by the liquid phase oxidation of acetaldehyde with molecular oxygen, the steps of effecting the oxidation in the presence of paraldehyde, distilling the reaction mixture to remove water and acetic acid therefrom in the form of a vapor in admixture with paraldehyde and to leave a residue of acetic anhydride and thereafter separating the paraldehyde from its admixture with acetic acid.

2. In a process for the manufacture of acetic anhydride by the liquid phase oxidation of acetaldehyde with molecular oxygen, the steps of effecting the oxidation in the presence of paraldehyde, distilling the reaction mixture to remove water and acetic acid therefrom in the form of a vapor in admixture with paraldehyde and to leave a residue of acetic anhydride and thereafter separating the paraldehyde from its admixture with acetic acid by depolymerising said paraldehyde to acetaldehyde and distilling off the formed acetaldehyde.

3. A process for the continuous production of acetic anhydride which comprises treating a mixture of acetaldehyde and paraldehyde with oxygen at a temperature between 30° and 50° C., withdrawing a portion of the reaction products to a distillation column wherein the formed acetic anhydride is separated from the lower-boiling substances in the reaction product, which latter substances are condensed in a vessel from which they are passed to a second distillation column in which paraldehyde is depolymerised, the produced acetaldehyde being condensed in a cooled receiver containing paraldehyde and a polymerising agent, from which receiver the paraldehyde and acetaldehyde thus obtained is returned to the oxidation reaction, the acetic acid and water being withdrawn from said second distillation column.

4. A process for the production of acetic anhydride which comprises treating a mixture of acetaldehyde and paraldehyde with oxygen in the presence of a neutralising agent, distilling the reaction mixture to remove water and acetic acid therefrom in the form of a vapour in admixture with paraldehyde and to leave a residue of acetic anhydride, thereafter separating the paraldehyde from its mixture with acetic acid by depolymerising the paraldehyde to acetaldehyde, condensing said acetaldehyde in a cooled receiver containing paraldehyde and an acidic polymerising agent thereby polymerising it to a mixture of paraldehyde and acetaldehyde and recycling said mixture to the oxidation stage.

5. A process for the production of acetic anhydride which comprises treating a mixture of acetaldehyde and paraldehyde with oxygen in the presence of a neutralising agent, distilling the reaction mixture in vacuo to remove water and acetic acid therefrom in the form of a vapour in admixture with paraldehyde and to leave a residue of acetic anhydride, thereafter separating the paraldehyde from its mixture with acetic acid by depolymerising the paraldehyde to acetaldehyde, condensing said acetaldehyde in a cooled receiver containing paraldehyde and an acidic polymerising agent thereby polymerising it to a mixture of paraldehyde and acetaldehyde and recycling said mixture to the oxidation stage.

6. A process for the continuous production of acetic anhydride which comprises treating a mixture of acetaldehyde and paraldehyde with oxygen, withdrawing a portion of the reaction products to a distillation column wherein the formed acetic anhydride is separated from the remainder of the substances in the reaction product, which latter substances are condensed in a vessel from which they are passed to a second distillation column in which paraldehyde is depolymerised by heating at normal pressure in the presence of a small amount of sulphuric acid, the produced acetaldehyde being condensed in a cooled receiver containing paraldehyde and a polymerising agent from which receiver the paraldehyde and acetaldehyde thus obtained is, after neutralisation, returned to the oxidation reaction, the acetic acid and water being withdrawn from said second distillation column.

7. A process for the continuous production of acetic anhydride which comprises treating a mixture of acetaldehyde and paraldehyde with oxygen, withdrawing a portion of the reaction products to a distillation column wherein the formed acetic anhydride is separated from the remainder of the substances in the reaction product, which latter substances are condensed in a vessel from which they are passed to a second distillation column in which paraldehyde is depolymerised by heating at normal pressure in the presence of a small amount of sulphuric acid, the produced acetaldehyde being condensed in a cooled receiver containing paraldehyde and a polymerising agent from which receiver the paraldehyde and acetaldehyde thus obtained is returned to the oxidation reaction wherein an amount of neutralising agent sufficient to neutralise the polymerising agent in the acetaldehyde-paraldehyde mixture being recycled is maintained, the acetic acid and water being withdrawn from said second distillation column.

8. In a process for the manufacture of acetic anhydride by the liquid phase oxidation of acetaldehyde with molecular oxygen, the steps of effecting the oxidation in the presence of paraldehyde, distilling the reaction mixture to remove water and acetic acid therefrom in the form of a vapor in admixture with paraldehyde and to leave a residue of acetic anhydride.

KARL HEINRICH WALTER TUERCK.
ERIC HARVEY BRITTAIN.